(No Model.) 2 Sheets—Sheet 1.
W. S. SCALES.
LAWN MOWER.
No. 463,078. Patented Nov. 10, 1891.
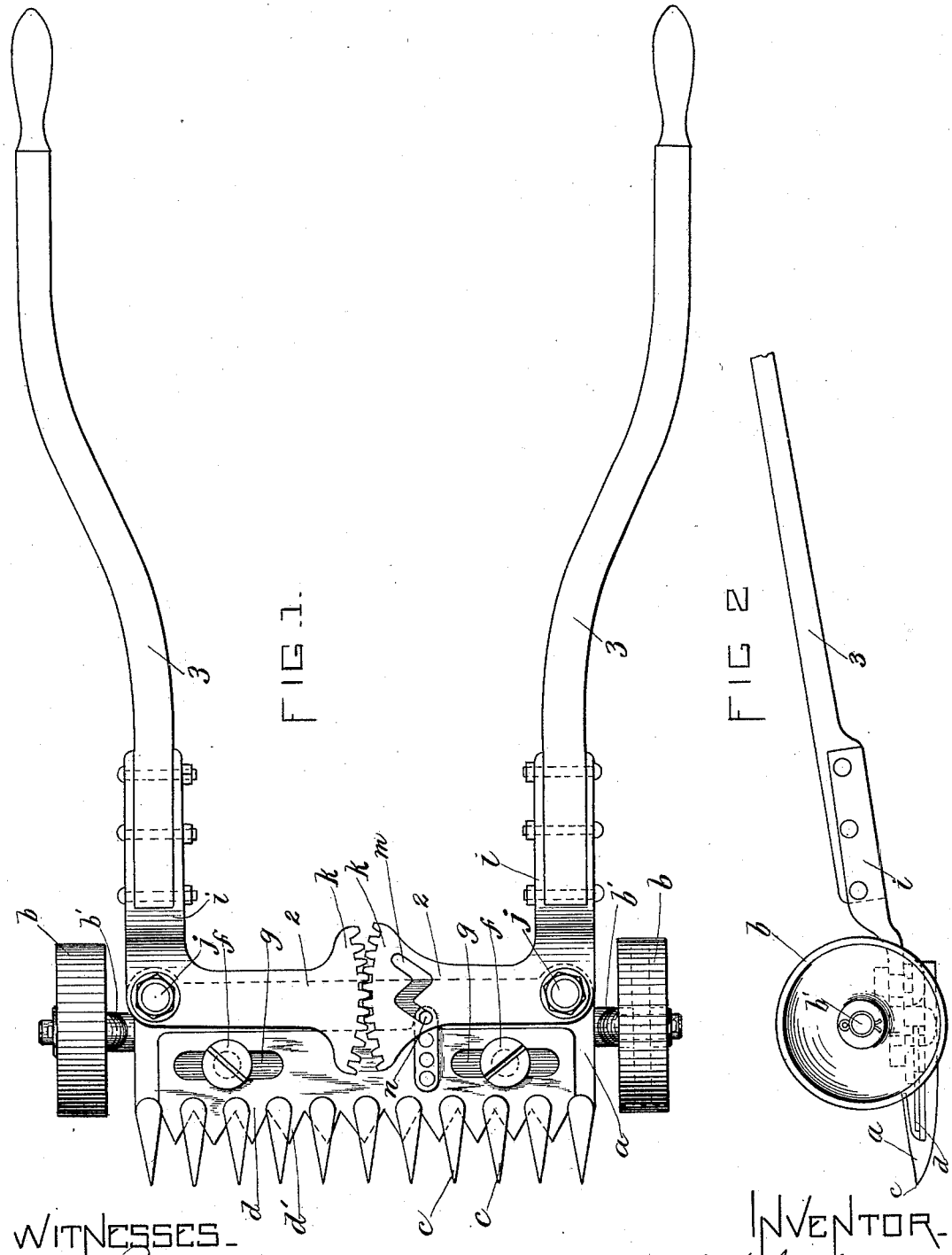
WITNESSES
INVENTOR

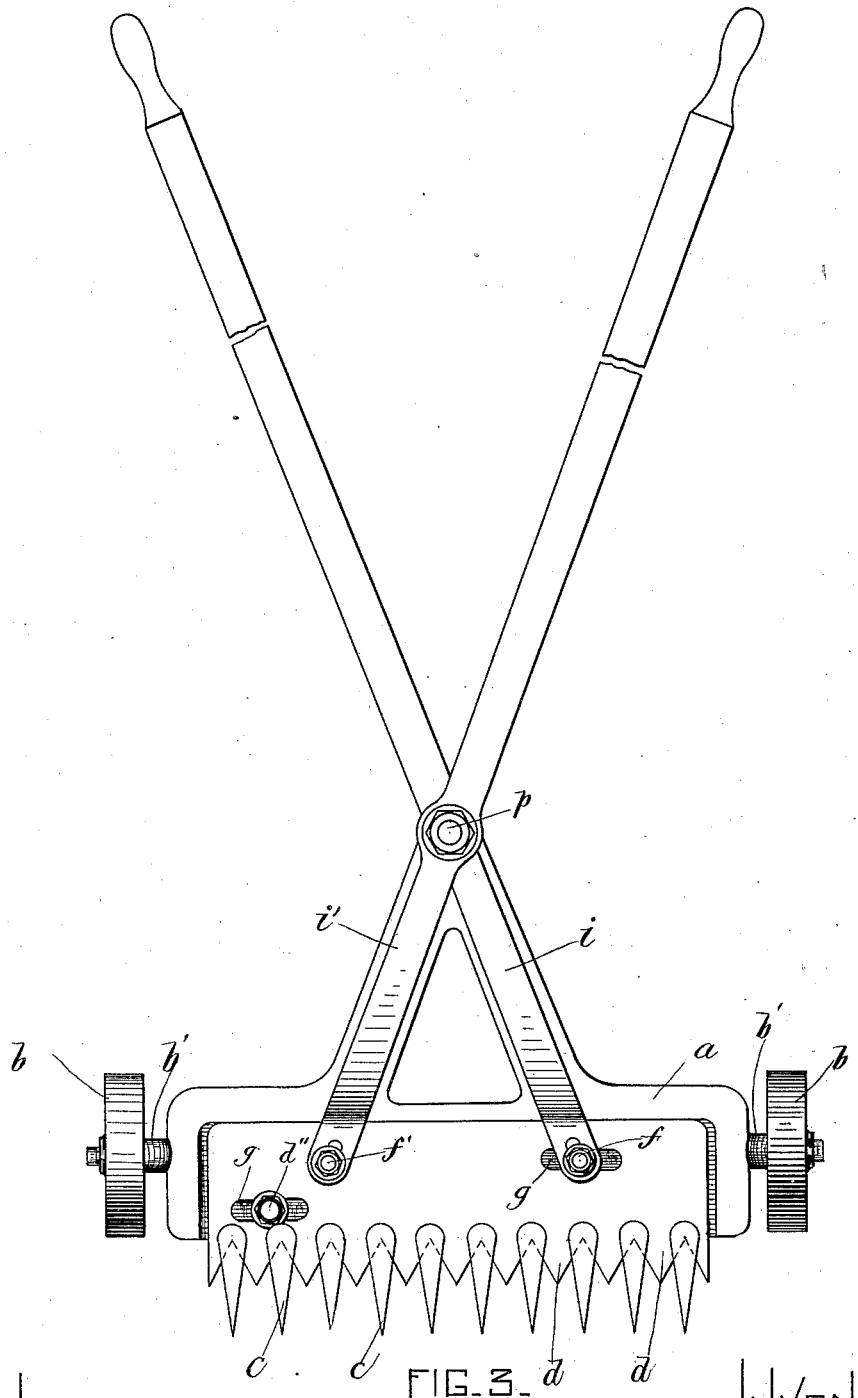

UNITED STATES PATENT OFFICE.

WILLIAM S. SCALES, OF EVERETT, ASSIGNOR OF THREE-FIFTHS TO JOSEPH H. CLARKE, OF QUINCY, AND JOHN B. HUMPHREY, OF SOMERVILLE, MASSACHUSETTS.

LAWN-MOWER.

SPECIFICATION forming part of Letters Patent No. 463,078, dated November 10, 1891.

Application filed November 25, 1889. Renewed April 3, 1891. Serial No. 387,476. (No model.)

*To all whom it may concern:*

Be it known that I, WILLIAM S. SCALES, of Everett, in the county of Middlesex and State of Massachusetts, have invented certain new and useful Improvements in Lawn-Mowers, of which the following is a specification.

This invention has for its object to provide a simple and effective lawn-mower adapted to cut in advance of the supporting-wheels, so that it can cut grass close to fences, trees, and other obstructions, and provided with a reciprocating knife or cutter bar and guard-fingers co-operating therewith, so that grass of any height can be cut.

The invention consists in the combination of a carrier or finger bar provided with guard-fingers and mounted on supporting-wheels, a knife-bar having a series of knives adapted to be reciprocated on said finger-bar and to co-operate with the fingers thereof, two rearwardly-extending pivoted handles or levers, one of which is pivoted to the finger-bar without engagement with the knife-bar, while the other is engaged with the knife-bar, so that when laterally oscillated it will reciprocate the knife-bar, and connections between the two handles, whereby each is kept in operative relation to each other and to the finger and knife bars, the arrangement being such that the oscillation of the lever engaged with the knife-bar will reciprocate the latter and cause it to cut the grass.

Of the accompanying drawings, forming a part of this specification, Figure 1 represents a top view of my improved lawn-mower. Fig. 2 represents a side view of the same. Fig. 3 represents a top view of a modification.

The same letters of reference indicate the same parts in all of the figures.

In the drawings, referring first to Figs. 1 and 2, $a$ represents the finger bar or carrier, which is supported by wheels $b\ b$ and is provided at its front edge with guard-fingers $c\ c$ of the form usually employed in reciprocating cutter mowing-machines. The wheels $b\ b$ rotate on bearings $b'\ b'$, which may be formed on or attached independently to the finger bar or carrier $a$, said bearings being preferably offset or raised above the finger-bar to locate the latter close to the surface of the ground.

$d$ represents the knife-bar, which is adapted to be reciprocated on the finger-bar $a$, and has the usual V-shaped knives $d'$, arranged to co-operate with the guard-fingers in cutting standing grass when the bar $d$ is reciprocated. Any suitable means may be provided to guide the knife-bar in its reciprocating movements. The means here shown are studs $f\ f$, affixed to the finger-bar and slots $g\ g$ in the knife-bar, the studs passing through said slots.

$i\ i$ represent the bell-crank levers, which are pivoted at $j\ j$ to the finger bar or carrier, and have toothed segments $k\ k$ on the swinging ends of their shorter arms 2 2, said segments meshing with each other. One of the shorter arms has a camway or slot $m$ of zigzag form, which receives a stud or trundle-roll $n$, secured to the knife-bar. The longer arms 3 3 of the levers are extended rearwardly and inclined upwardly, so that they can be grasped by a person standing between them at the rear of the finger-bar and cutting mechanism and used as handles by which the machine is propelled.

Operation: The operator, standing between and grasping the longer arms or handles 3 3, pushes the machine ahead and at the same time oscillates the handles laterally by moving his arms simultaneously in opposite directions or outwardly and inwardly. The shorter arms 2 2 are thereby caused to oscillate toward and from the cutting devices, so that the slot or camway $m$ acts on the stud or roll $n$ in such manner as to reciprocate the same with the knife-bar. It will be seen that the gear-segments $k\ k$, connecting the levers $i\ i$, enable the power of both of the operator's arms to be utilized and prevent the levers from swinging loosely or being displaced from their operative positions.

It will be seen that the finger-bar, the pivots $j\ j$ on which the levers 3 3 oscillate, and the arms 2, with their gear-segments, constitute connections between the levers, whereby each is kept in operative relation to the other, and both are kept in operative relation to the finger and knife bars, so that the levers cannot swing about loosely, but are kept in the positions required to enable them to serve as pushing-handles.

In Fig. 3 I have shown a modification in which the handle or bar $i$ and handle or lever $i'$ are straight instead of being angular, and are connected by a pivot $p$, said handle or bar and handle or lever crossing each other at said pivot, which is made to engage a rearward extension of finger-bar $a$. The handle or bar $i$ is connected to stud $f$ of the finger-bar, while the handle or lever $i'$ is connected to stud $f'$ of the knife-bar. In the latter are formed two slots $g$ $g$, through one of which projects the stud $f$, while through the other slot extends a stud $d''$, secured to the finger-bar and which, together with stud $f$, serves as a guide for the knife-bar. The lower ends of handle or bar $i$ and handle or lever $i'$ are preferably slotted, so as to provide for easy operation and nicety of adjustment. In this modification the mower is guided and held by both handles and the knife-bar is operated by the handle or lever $i'$ connected thereto, while handle or bar $i$ is connected direct to the finger-bar, and its stud serves as a guide for the knife-bar.

I claim—

In a lawn-mower, the combination of the finger bar or carrier having guard-fingers, the knife-bar adapted to be reciprocated on the finger bar or carrier the elbow-levers pivoted to the finger bar or carrier and having rearwardly-projecting longer arms arranged to serve as handles, intermeshing gears on the shorter arms of said levers, a stud or projection secured to the knife-bar, and a slot or camway in one of said shorter arms engaged with said stud, as set forth.

In testimony whereof I have signed my name to this specification, in the presence of two subscribing witnesses, this 1st day of October, A. D. 1889.

WILLIAM S. SCALES.

Witnesses:
C. F. BROWN,
KATHERINE E. BROWN.